Patented Oct. 31, 1922.

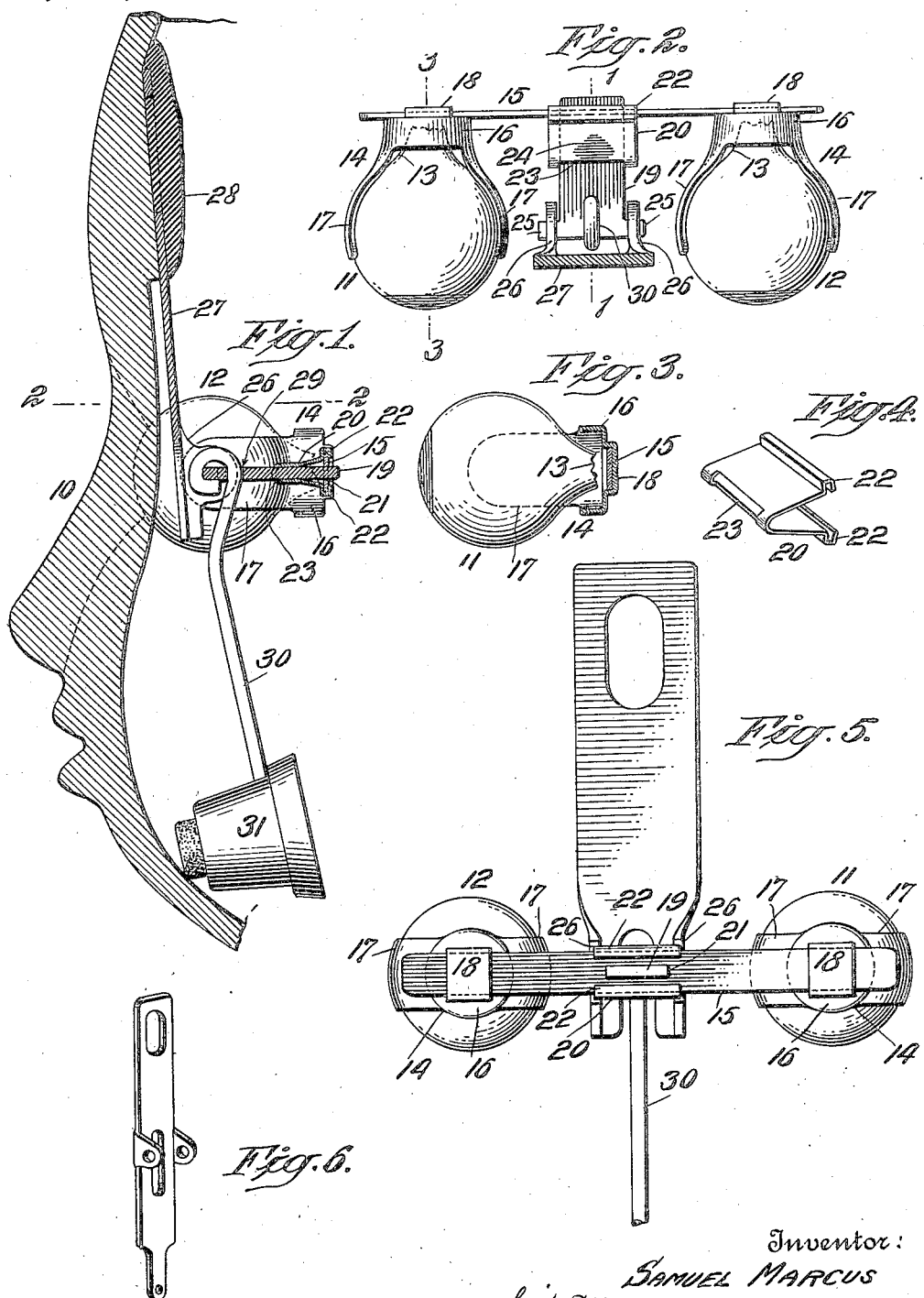

1,433,900

UNITED STATES PATENT OFFICE.

SAMUEL MARCUS, OF BROOKLYN, NEW YORK, ASSIGNOR TO F. & M. NOVELTY CO., INC., OF NEW YORK, N. Y., A CORPORATION OF NEW YORK.

EYE SET FOR DOLLS AND THE LIKE.

Application filed March 26, 1921. Serial No. 455,772.

*To all whom it may concern:*

Be it known that I, SAMUEL MARCUS, a citizen of the United States, and a resident of Brooklyn, in the county of Kings and State of New York, have invented certain new and useful Improvements in Eye Sets for Dolls and the like, of which the following is a specification.

The invention pertains to artificial eyes for dolls, display figures and the like, and it consists in the novel features hereinafter described, and particularly pointed out in the claims.

One object of my invention is to provide improved means whereby glass eyes may be suitably supported and allowed their rocking movement within the heads of dolls, and a further object of the invention is to provide eye-supporting means which will permit of the independent angular adjustment of the eyes within their holding members and the adjustment of the eyes toward and from each other to meet the requirements of the eye-sockets in the head of the doll.

It has been found difficult to properly support fragile glass eyes within the head of a doll in such manner as to preserve the due relation of the eyes to the eye-sockets and at the same time permit of the rolling action of the eyes in accordance with the movement of the doll; and difficulty has also been found in suitably connecting the fragile glass eyes of a pair of eyes with the bridge construction of the eye-set, from which a weight is ordinarily suspended. My invention is designed to afford suitable means for connecting the glass eyes to form an eye-set and for so mounting the eyes that that they may be independently angularly adjusted and also adjusted with relation to each other. A special feature of my invention resides in the means I provide for holding the individual fragile eyes and permitting of their adjustment, with an avoidance of danger of fracturing the eyes and without any necessity for cutting or in any manner treating the eyes to adapt them to their holding means.

The invention and satisfactory means for carrying the same into effect will be fully understood from the detailed description hereinafter presented, reference being had to the accompanying drawings, in which:

Fig. 1 is a vertical section through the face of a doll and eye mechanism embodying the essential features of my invention, the section through the eye mechanism being on the dotted line 1—1 of Fig. 2;

Fig. 2 is a horizontal section through the eye-set, taken on the dotted line 2—2 of Fig. 1;

Fig. 3 is a central vertical section through one portion of the eye-set, taken on the dotted line 3—3 of Fig. 2;

Fig. 4 is a detached perspective view of a clip forming a part of the eye-set mechanism, said clip being utilized as a means for connecting a rocker-plate or tongue with the bridge-piece which connects the two eyes to form a pair of eyes;

Fig. 5 is a rear elevation, partly broken away, of the eye-set, and

Fig. 6 is a detached perspective view of a form of hanger plate which may be utilized for supporting the eye-set as a substitute for the hanger-plate shown in Figs. 1 and 5.

In the drawings, 10 designates the face portion of the head of a doll, and 11, 12, respectively, denote the right eye and left eye for the doll. The eyes 11, 12 are of corresponding construction and are hollow and of glass and as ordinarily made have, at the back of the eyes, a hollow stem portion 13, this stem portion resulting from the ordinary methods of manufacturing the eyes. The eyes 11, 12 are mounted in special holders 14, of corresponding construction, and these holders are adjustably held upon the bridge-piece 15, which consists of a strip of spring metal of sufficient thinness to yieldingly press the eyes 11, 12 against the sockets therefor in the face of the doll, thereby maintaining the eyes in proper relation to said sockets, while at the same time permitting the eyes to have their proper rolling action due to the inclination or change of position of the doll.

The spring bridge-piece 15 I regard as very important in maintaining the proper relation of the eyes 11, 12, to the eye-sockets in the doll's face. The bridge-piece 15 is of rectangular cross section and may conveniently maintain the holders 14 in fixed relation thereto. The holders 14 are of special formation and each is preferably formed in one integral piece of sheet metal stamped out to provide a base or cup-like member 16, two side arms 17, and a back-sleeve 18 which is central at the back of the cup members 16 and of a shape to snugly receive the end portions of the bridge-piece 15, as may be seen in Fig. 3. The sleeve or loop 18 closely engages the rear face of the bridge-piece 15 and also the upper and lower edges of said bridge-piece, and the bridge-piece outside of the sleeves or loops 18 has a flat bearing against the base members 16, and these several features of construction result in the holders 14 being evenly secured upon the bridge-piece 15 and in said holders being so firmly held that they have no rocking movement on said bridge-piece. The sleeves or loops 18 being flat and the bridge-piece being flat and engaging the flat ends of the cup members 16, make it unnecessary to provide any additional means for avoiding the rocking of the eyes on the bridge-piece. The holders 14 may be spaced apart on the bridge-piece 15 to meet such requirements as may exist with reference to irregularities in dolls' heads, and the sleeves or loops 18 so snugly fit the bridge-piece 15 that it is unnecessary to provide any means for fastening said sleeves or loops to said bridge-piece, the holders 14 retaining their adjusted position on said bridge-piece during the application of the eyes to the doll's head. If anyone should desire to do so, however, the sleeves or loops 18 may be rigidly fastened to the bridge-piece 15 by some shellac or solder or other means.

One important feature of my invention resides in the spring bridge-piece 15 with the holders 14 adapted to receive the eyes and to be secured upon the end portions of the bridge-piece in the manner I have just described. Another important feature of my invention relates to the holders 14 in themselves. These holders 14 form sockets to receive and permit of the angular adjustment of the eyes 11, 12, and said holders are adapted to receive and retain said eyes without any special treatment of the eyes themselves or the provision of any additional means for securing the eyes within said holders. The side arms 17 with which each holder 14 is equipped extends forwardly beyond the transverse center of the eyes and are reasonably broad, as shown by the dotted lines in Fig. 3, and are made concave on their facing sides so as to lap upon a fairly considerable portion of the convex surface of the eyes. The arms 17 may be sprung out to receive the eyes, and they closely engage the eyes without fracturing them and without interfering with the eyes being independently adjusted about their axes so that the iris portion of the eye may be adjusted upwardly or downwardly or toward the right or toward the left, as occasion may require. The holders 14 are each in a single piece, and these holders receive the eyes 11, 12 just as said eyes are manufactured and without either cutting them or equipping them with secured holding means, said holders being adapted to receive the eyes just as they are manufactured and properly hold them in due relation to each other for the purpose of providing an eye-set. The holders 14 dispense with complicated features which have been heretofore utilized for holding glass eyes and provide very simple means for efficiently holding the eyes and permitting of their angular adjustment, while at the same time said holders also permit by their adjustment on the bridge-piece 15, of the correct spacing apart of the eyes 11, 12.

The bridge-piece 15 is held upon a rocker-plate or tongue 19 by means of a clip 20, the rear end of said plate 19 being inserted through an opening 21 in the bridge-piece 15, and said clip 20 being secured upon said plate 19 and having rear flanged edges 22 adapted to be closed upon the upper and lower edges of the bridge-piece 15, as shown in Fig. 1. The clip 20 is a folded piece of sheet metal having at its forward edge a slot 23 through which the plate or tongue 19 is passed, and said clip 20 is finally secured to the plate or tongue 19 by spot welding, as I indicate by lines at 24. Before the clip 20 is fastened permanently to the rocker plate or tongue 19, said clip and bridge-piece 15 are adjusted along said plate 19 to suit the conditions of the eye-sockets in the head of the doll, said plate 19 permitting the bridge 15 to be adjusted toward or from the face of the doll as the conditions may require prior to the securing of said clip and bridge-piece in rigid relation to the plate 19 by means of the spot welding 24 or such other means of securing the parts together as may be adopted.

The plate or tongue 19 is a plain flat bar, as shown, and at its forward side edges is formed with trunnions or studs 25 which have a bearing in apertures formed in the side ears 26 of the hanger plate 27, said plate 27 being of known construction and adapted to be secured within the forehead portion of the doll's head by shellac or other cementitious material 28, as usual. The engagement of the lower end of the hanger plate 27 by means of the ears 26 with the studs 25 serves to suspend the eye-set from said hanger and also to permit the plate 19 to have a rocking motion due to changing positions of the doll and which rocking motion is communicated through the bridge 15 to the eyes 11, 12. The plate 19 is formed with an opening 29 just in rear of its front edge and through this opening the upper end of the weight rod 30 is passed and carried around the front edge of said plate 19, as shown in Fig. 1, thereby firmly suspending the weight rod 30 and its weight 31 from the front edge of the rocker plate 19. When the doll's head is in the position shown in Fig. 1 the iris of the eyes will face frontwardly and the weight 31 will become arrested at the chin portion of the head of the doll. If the doll should be reclined rearwardly, the weight 31 will move in a direction toward the back of the neck of the doll's head and roll, through the plate 19 and bridge 15, the eyes 11, 12 to sleeping or closed position. When the doll is again restored to vertical position, the weight 31, acting through the rocker-plate 19, will restore the eyes to normal or open position.

The rocker-plate 19 is important in permitting the convenient adjustment of the bridge-piece 15 toward and from the face of the doll and is also of importance in transmitting the action of the weight 31 to the eyes 11, 12. The parts of the eye-set have been constructed with the view of conveniently obtaining all of the adjustments necessary to adapt the eye-sets to the varying conditions to be found in doll's heads, said heads presenting irregularities with respect to the eye-sockets therein and the eyes 11, 12 requiring adjustment to meet the conditions of said heads regardless of what they may be. The parts of the eye-set of my invention have been designed for efficient operation and durable and simple construction. In applying the eyes to the head of a doll, the adjustment of the clip 20 on the rocking plate or tongue 19 may be utilized to place a proper tension in the ends of the bridge 15 tending to yieldingly press the eyes 11, 12 against the eye-sockets in the doll's head.

In Fig. 1 I illustrate the hanger 27 as being a single hanger to be secured to the inner forehead of the doll's head. I also make these hangers double so that one end may be secured to the inner forehead of the doll's head and the lower end thereof to the face of the doll somewhere about the mouth or lips, and this double form of hanger is well known and a specimen of which I illustrate in Fig. 6.

It is usual, after the eyes of an eye-set have been individually angularly adjusted and have been properly spaced apart on their bridge connections, to form imitation upper eye lids on the eyes, so that when the doll is reclined the eyes on rolling toward the front and downwardly may carry said lids across the eye-sockets in the head of the doll and convey the impression of the doll being asleep, and usually said imitation lids are formed by dipping the upper and rear portions of the eye-set in flesh-tinted coloring matter and allowing the color to harden. In the case of my invention the said eye-lids may be formed as usual and the coloring matter into which the eye-set is dipped for the production of the eye-lids will coat over portions of the holders 14 and serve to cement the eyes in said holders and said holders on the ends of the bridge 15.

The invention presented in this application embodies certain features of the eye-set made the subject of my application for Letters Patent filed November 24, 1920, and also certain improvements in said eye-set having reference more particularly to the bridge construction and to the holders for the individual eyes.

What I claim as my invention and desire to secure by Letters-Patent, is:

1. An eye-set for dolls and the like, comprising a pair of artificial eyes, a bridge connecting the eyes and being a strip of spring metal adapted at its ends to yieldingly press the individual eyes against the eye sockets in the head of a doll, a hanger plate to be secured within the head of a doll, a rocker-plate pivotally connected with said hanger and having a weight suspended from its forward end, and a clip secured on said rocker-plate and having end members engaging and overlapping the upper and lower edges of said bridge for securing the bridge to said rocker plate, said clip and said bridge having openings in them through which said rocker plate is passed and which admit of the adjustment of said bridge and the eyes carried thereby with relation to the face of the doll's head.

2. An eye-set for dolls and the like, comprising a pair of artificial eyes, a bridge connecting the eyes, a hanger plate to be secured within the head of a doll, a rocker-plate pivotally connected with said hanger and having a weight suspended from its forward end and a clip secured on said rocker-plate and having end members engaging and overlapping the upper and lower edges of said bridge for securing the bridge to said rocker plate, said clip and said bridge having openings in them through which said rocker plate is passed and which admit of the adjustment of said bridge and the eyes carried thereby with relation to the face of the doll's head.

3. An eye-set for dolls and the like, comprising a pair of artificial eyes, a bridge connecting and supporting said eyes, means pivotally supporting said bridge within the head of the doll, and holders on said bridge for said eyes, said holders each comprising a base portion engaged with said bridge and having arms extending forwardly beyond the transverse center of the eyes and engaging the sides of and confining the eyes, said arms permitting said eyes to be adjusted angularly to the right or left and upwardly or downwardly, as may be necessary.

4. An eye-set for dolls and the like, comprising a pair of artificial eyes, a bridge connecting and supporting said eyes, means pivotally supporting said bridge within the head of the doll, and holders on said bridge for said eyes, said holders each comprising a base portion having a loop slid upon said bridge and curved arms extending forwardly beyond the transverse center of the eyes and engaging the sides of and confining the eyes, said arms permitting said eyes to be adjusted angularly to the right or left and upwardly or downwardly, as may be necessary.

5. An eye-set for dolls and the like, comprising a pair of artificial eyes, a bridge connecting and supporting said eyes, means pivotally supporting said bridge within the head of the doll, and holders on said bridge for said eyes, said holders each being in one piece of sheet metal and comprising a cup base portion having a loop to slide on said bridge and arms extending forwardly beyond the transverse center of the eyes and engaging the sides of and confining the eyes, said arms permitting said eyes to be adjusted angularly to the right or left and upwardly or downwardly, as may be necessary.

Signed at New York city, in the county of New York and State of New York, this 23rd day of March, A. D. 1921.

SAMUEL MARCUS.